(12) United States Patent
Horton

(10) Patent No.: US 6,250,413 B1
(45) Date of Patent: Jun. 26, 2001

(54) MOTOR MOUNT FOR A GO-CART

(76) Inventor: Gilbert H Horton, P.O. Box 386, McBee, SC (US) 29101

( * ) Notice: Subject to any disclaimer, the term of this patent is extended or adjusted under 35 U.S.C. 154(b) by 0 days.

(21) Appl. No.: 09/359,861

(22) Filed: Jul. 26, 1999

(51) Int. Cl.$^7$ .................................................. F16M 1/00
(52) U.S. Cl. ......................... 180/291; 180/292; 180/298; 248/674
(58) Field of Search .................................. 180/291, 292, 180/298, 299; 248/638, 657, 659, 674, 647, 224.8, 224.7

(56) References Cited

U.S. PATENT DOCUMENTS

| | | | |
|---|---|---|---|
| 3,107,889 | * 10/1963 | Peterson | 248/674 |
| 3,420,480 | * 1/1969 | Matson | 248/672 |
| 3,799,283 | 3/1974 | Freber . | |
| 4,097,012 | * 6/1978 | McIntyre | 248/674 |
| 4,098,477 | 7/1978 | Perez . | |
| 4,238,104 | * 12/1980 | Hamilton | 248/566 |
| 5,022,668 | * 6/1991 | Kenny | 280/7.14 |
| 5,167,396 | * 12/1992 | Burba et al. | 248/638 |
| 5,714,815 | 2/1998 | Fritzinger et al. . | |
| 5,799,923 | 9/1998 | Carr et al. . | |
| 5,833,205 | * 11/1998 | Lindbeck | 248/638 |

* cited by examiner

Primary Examiner—Lanna Mai
Assistant Examiner—Hau Phan
(74) Attorney, Agent, or Firm—Michael A Mann; Nexsen Pruet Jacobs & Pollard

(57) ABSTRACT

A motor mount for securing a motor to the frame of a go-cart includes a mounting plate and a clamp. The mounting plate is designed to be attached to the motor and then to remain with the motor as an adaptor for quick attachment to the clamp. The clamp grips the frame of the go-cart with a base and a body pivotally attached to each other at one end and releasibly attachable to each other at the other end by a single bolt. When the bolt is removed, the clamp can be opened and removed from the frame. The mounting plate is slidably receivable within a track formed in the body and locked in place until the motor is to be removed.

16 Claims, 10 Drawing Sheets

MOTOR MOUNT FOR A GO-CART

FIELD OF THE INVENTION

The present invention relates to a device for securing a motor to the frame of a go-cart.

BACKGROUND

In go-carts, the motor is bolted to a motor mount which is in turn bolted to the frame. In order to remove the motor, the entire motor mount must also be removed. This chore requires undoing several bolts, which are all positioned underneath the motor mount, which means that to have clear access to the bolts, the go-cart must be elevated. There is a need for a simpler and faster way of changing out motors for go-carts.

SUMMARY OF THE INVENTION

According to its major aspects and broadly stated, the present invention is a motor mount for a go-cart that allows the motor to be removed much more quickly and easily. The present motor mount has base and body that operate as a clamp to secure a motor to the go-cart frame, and a mounting plate that operates as an adaptor secured to the motor in a manner that allows the motor to be easily and quickly attached to or removed from the body. The mounting plate has a plurality of mounting bolts thereon for the permanent attachment of a motor, and a receiver that allows it to be coupled to the body quickly but securely. The mounting plate, once attached to the motor, can remain with it.

The motor mount is clamped to the frame of the go-cart by a single bolt that is easily accessed from above. Undoing this bolt unclamps the motor mount from the go-cart frame.

The plate is secured to a body using a track formed in the top surface of the body and a receiver on the underside of the mounting plate formed to slide within the track. A simple locking mechanism secures the receiver of the mounting plate in position within the track. Unlocking the mounting plate requires only a partial rotation of a lock screw to free up the mounting plate.

The body and base are bolted at one end and pivotally attached at the other end so that, once the first end is unbolted, the base is free to swing away from that end and thereby allow the motor mount to be pulled free of the go-cart frame.

A major advantage of the present invention the use of a mounting plate as an adaptor of the motor to the rest of the motor mount. This mounting plate is configured to be quickly and easily attached and detached from the motor mount so that the motor, with its more or less permanently attached mounting plate, can be removed from the go-cart in a few seconds without having to elevate the go-cart.

Another major advantage of the present invention is the ability to remove the motor mount itself by undoing a single bolt, which is removed without having to access the underside of the mount. The present motor mount is made in the form of a clamp with one end of its two portions, the base and the body, pivotally attached and with enough play between the two portions to allow it to be pulled free of the frame of the go-cart.

Still another advantage of the present invention is that the user can set up the mounting plate so that the motor, when mounted, will be in a position preferred by the driver. This advantage stems from the way the receiver is attached to the mounting plate.

Still another advantage of the present invention is the way in which the receiver fits into the track on the body and locks to it. This fit is designed to hold the motor securely to the motor mount but to allow the motor to be removed very quickly, simply by a partial turn of a locking screw and a small lateral movement of the mounting plate.

Other features and advantages of the present invention will be apparent to those skilled in the art from a careful reading of the Detailed Description of Preferred Embodiments presented below and accompanied by the drawings.

DETAILED DESCRIPTION OF A PREFERRED EMBODIMENT

Referring now to the figures, the present invention is a motor mount for a go-cart. A first preferred embodiment is illustrated in FIGS. 1–7. A second preferred embodiment is illustrated in FIGS. 8–13. The principal difference between the two embodiments is in the shape of the body which translates into the angle at which the motor is held by the mount and is suitable for some kinds of motors. The motor and the go-cart's frame are not part of the present invention.

Figure 1:
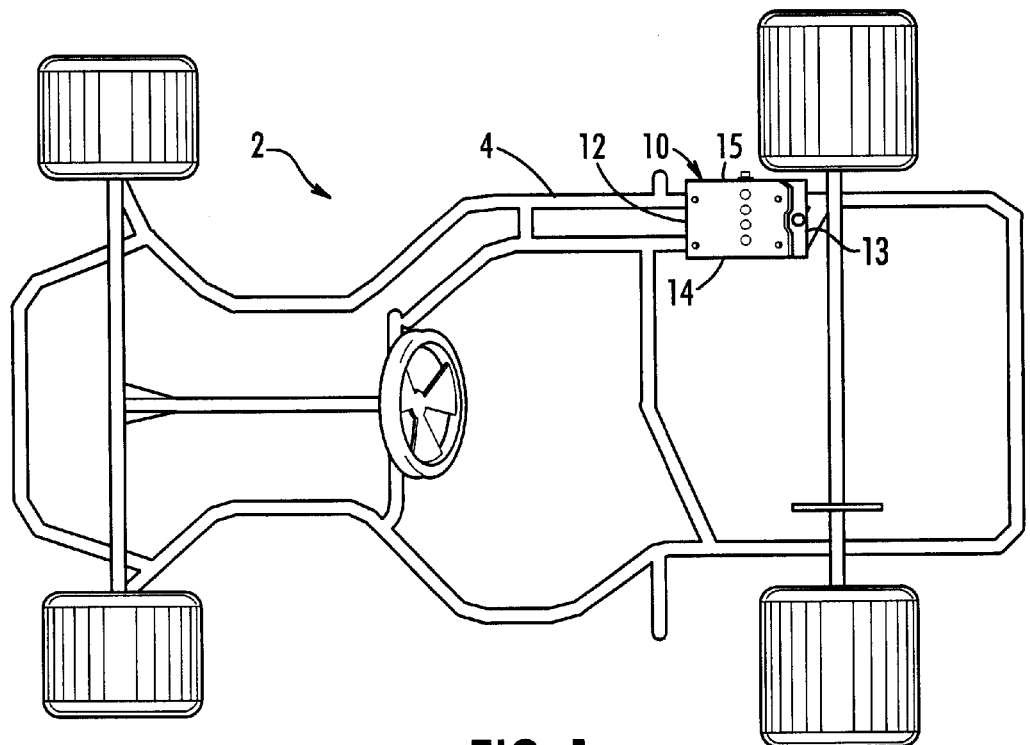
FIG. 1 is a top view of a go-cart frame with a motor mount, according to a preferred embodiment of the present invention.

FIG. 1 shows the top view of a go-cart 2 having a frame 4 to which the motor mount, generally referred to by 10, is secured. Although motor mount 10 is described with reference to a go-cart, it is recognized that the motor mount 10 could be used for various devices that require motors such as, for example, lawn mowers or boats. In terms of orientation, motor mount 10 has a front 12, back 13, left side 14 and right side 15.

Mount 10 has three main components: a base 20, a body 30 and a mounting plate 90. Base 20 and body 30 together form a clamp that secures to frame 4 of go-cart 2 and pivots between an open position where it can be removed from frame 4 and a closed position where it grips frame 4. Mounting plate 90 serves to adapt a motor to mount 10 and, once attached to a motor, will generally remain with the motor so that, when that motor is to be mounted to cart 2, it can be done 20 using the present motor mount 10 very quickly and easily.

Figure 2A:
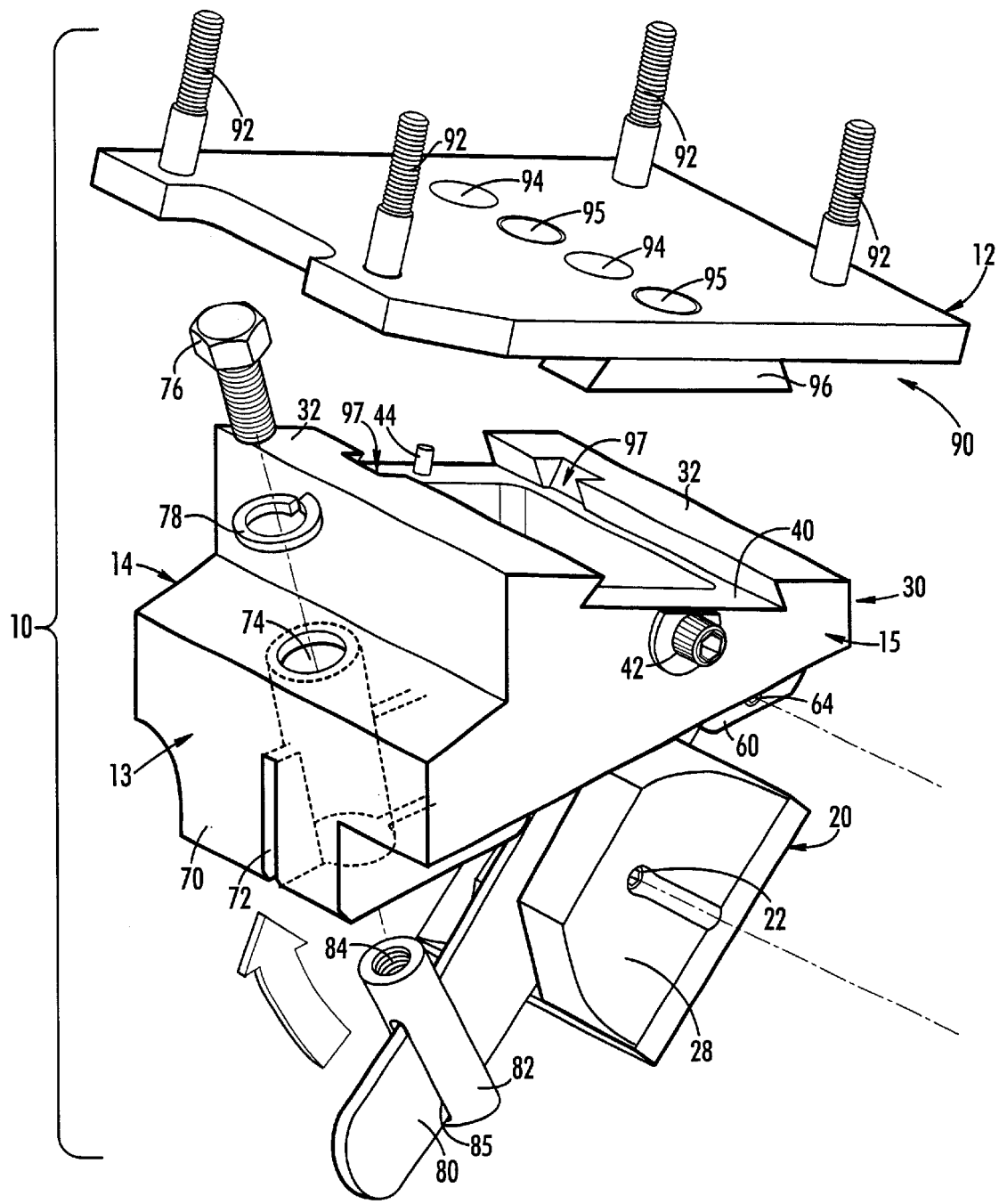
FIG. 2A is an exploded, rear perspective view of a motor mount, according to a preferred embodiment of the present invention.
Figure 2B:
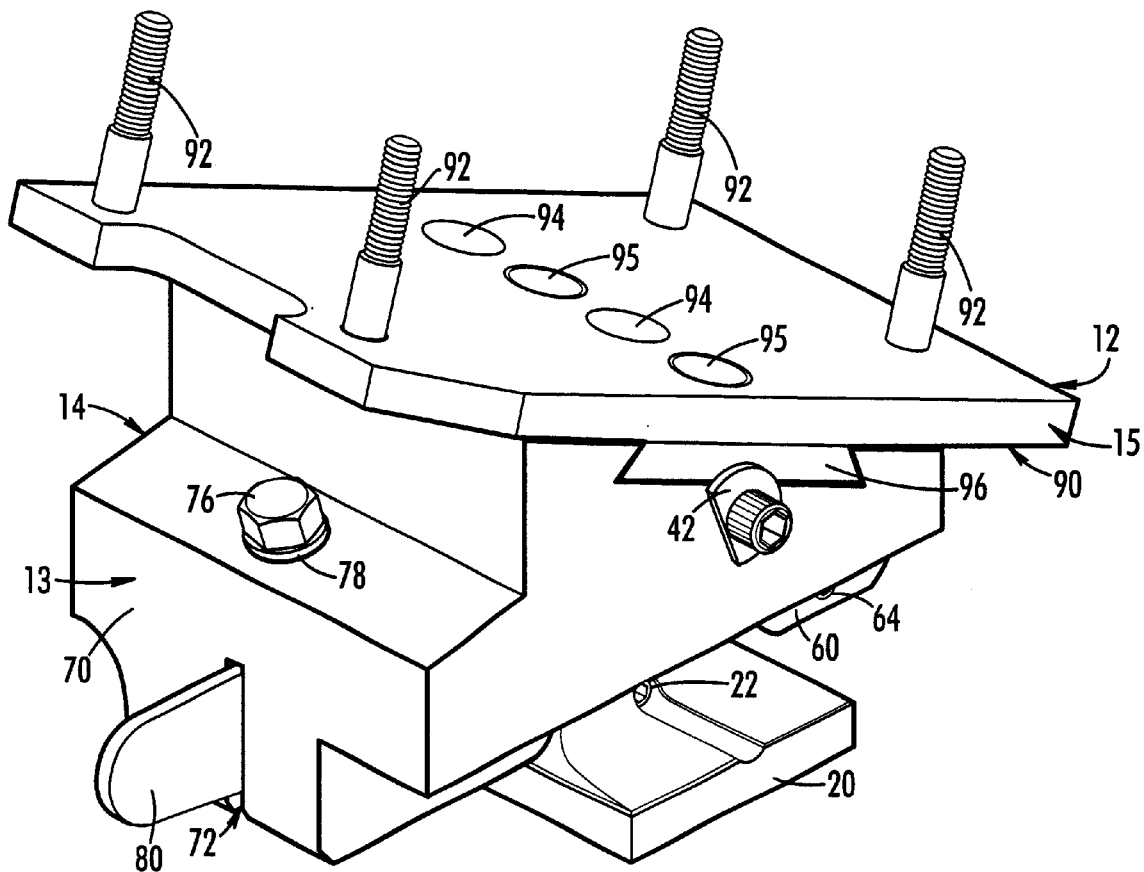
FIG. 2B is a rear perspective view of the assembled motor mount of FIG. 2A.

FIGS. 2A and 2B show right rear perspective views of motor mount 10 both exploded and assembled, respectively. Plate 90 is dimensioned to be secured to a motor plate of a motor (not shown) and has a plurality of mounting bolts 92 thereon. The mounting bolts 92 are arranged on the face of plate 90 to align with the corresponding holes on a motor plate. If the number and arrangement of mounting holes on the motor are different, the number and arrangement of the mounting bolts 92 on the face of mounting plate 90 would be modified to correspond to and align with the holes on motor plate.

A receiver 96 is preferably secured to the plate 90 in two different positions so that the motor can be secured to motor mount 10 slightly to the left or to the right, as preferred. If this lateral adjustment is not needed, receiver 96 could be formed integral to plate 90 or permanently attached thereto by bolting or welding, for example.

Receiver 96 has two holes that are capable of receiving a pair of adjustment bolts 95. A plurality of adjustment holes 94 on the face of plate 90 allows two adjustment bolts 95 to pass through any two properly spaced adjustment holes and be received by the two holes in receiver 96. The choice of which two holes depends on exactly where the user wants the motor to be when mounted to frame 2 by motor mount 10.

Receiver 96 is dimensioned to be received within a track 40 formed in body 30 of motor mount 10. Although the ends of receiver 96 could be formed to have various cross-sections, preferably receiver 96 is formed with a trapezoidal or dove-tail cross-section on its ends. In order to reduce the lateral shift required for removing receiver 96 from track 40, plate 90 has a pair of cutout portions 97 that allow plate 90 and receiver 96 to be lifted clear of body 30 after a slight lateral movement of receiver 96 in track 40.

Body 30 has a surface 32 that is capable of carrying plate 90. Surface 32 preferably is slanted with respect to a base 20. On right side 15 of body 30 is a lock 42, while the left end of track 40 has a stop 44. Stop 44 limits lateral movement of receiver 96 within track 40 and is received within a stop slot 98 formed in receiver 96 when receiver 96 is properly positioned in track 40 of body 30. Lock 42 may then be rotated to a position that prevents lateral movement of receiver 96 or to a position that allows movement of receiver 96 as best seen by comparing FIG. 2A to FIG. 2B. Between stop 44, lock 42 in its locking position and the trapezoidal shape of the ends of receiver 96 and track 40, mounting plate 90 can be held securely to body 30.

Figure 3:
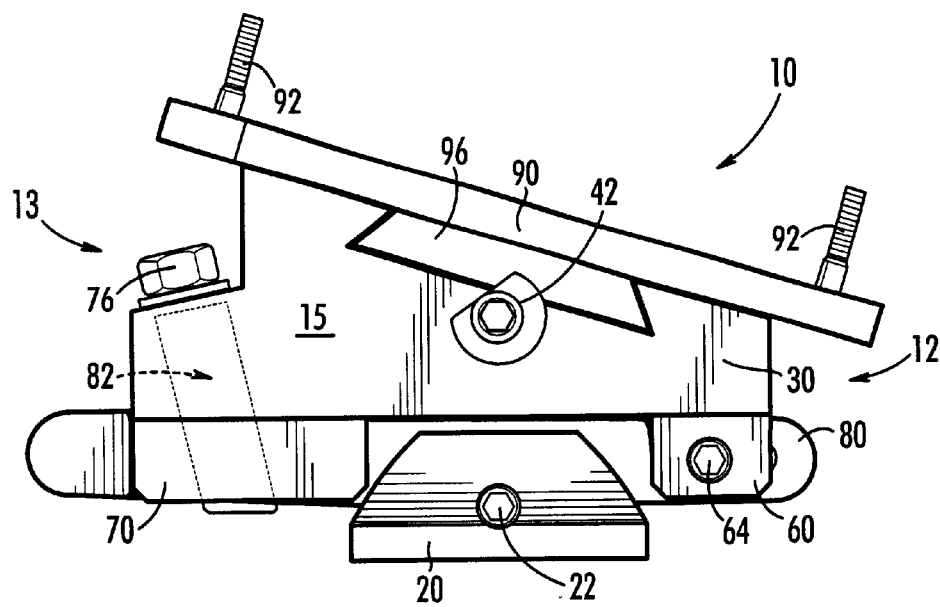
FIG. 3 is a right side view of the motor mount of FIG. 2B.
Figure 4A:
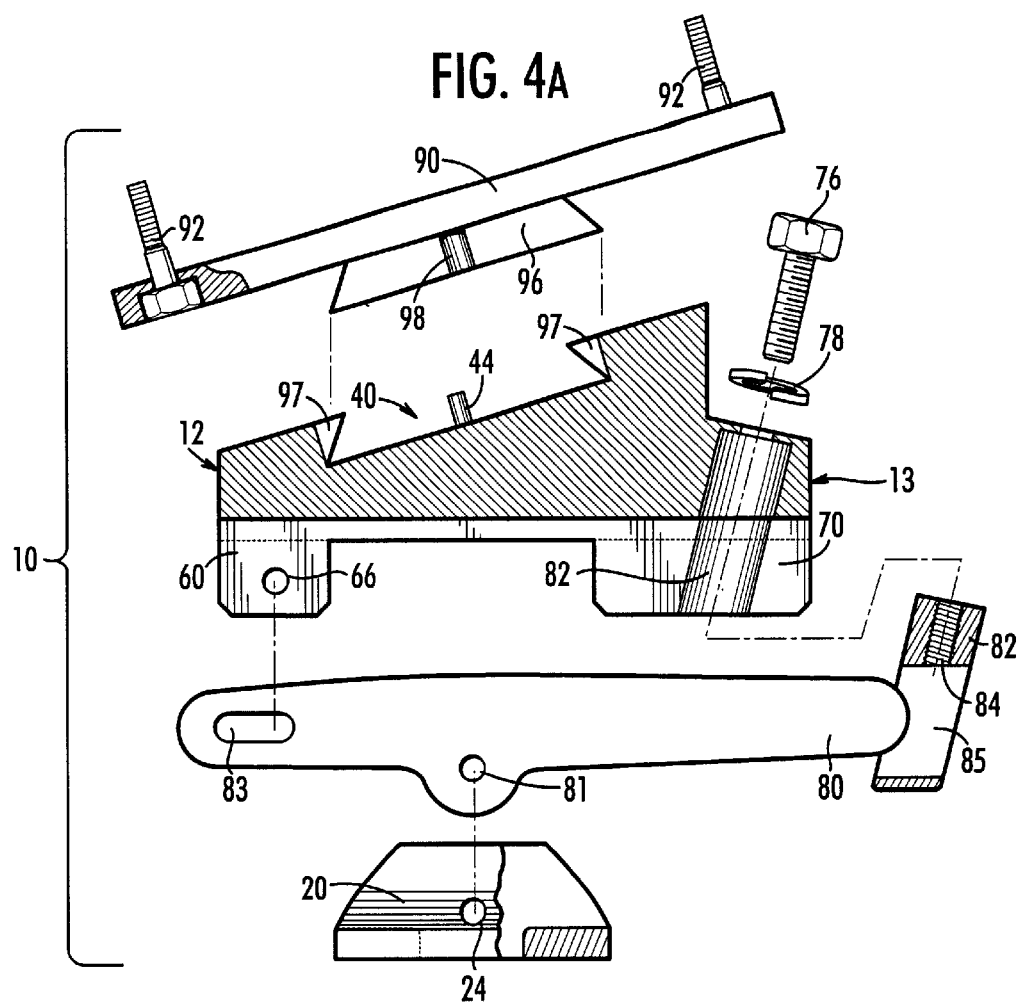
FIG. 4A is an exploded, partial cross sectional, right side view of the motor mount of FIG. 2B.
Figure 4B:
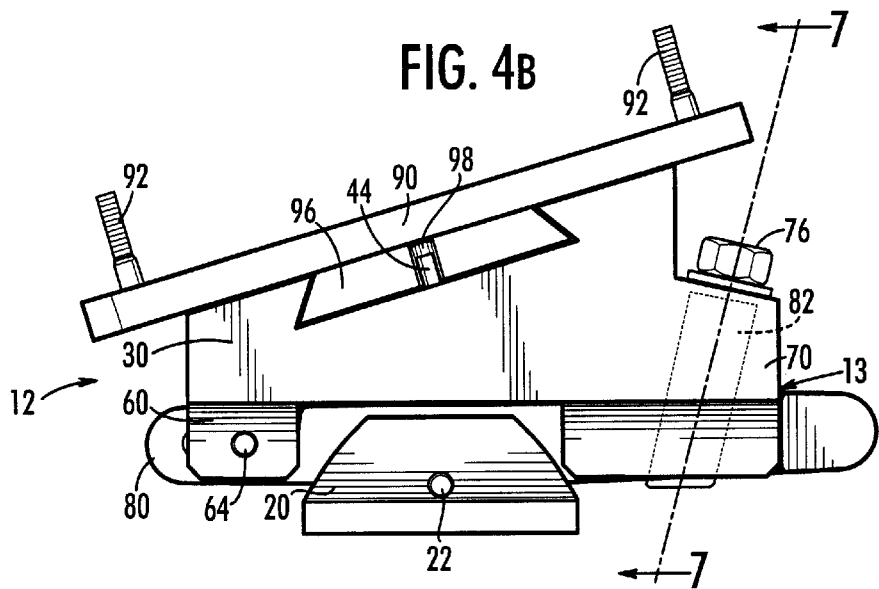
FIG. 4B is a right side view of the assembled motor mount of FIG. 4A.
Figure 5:
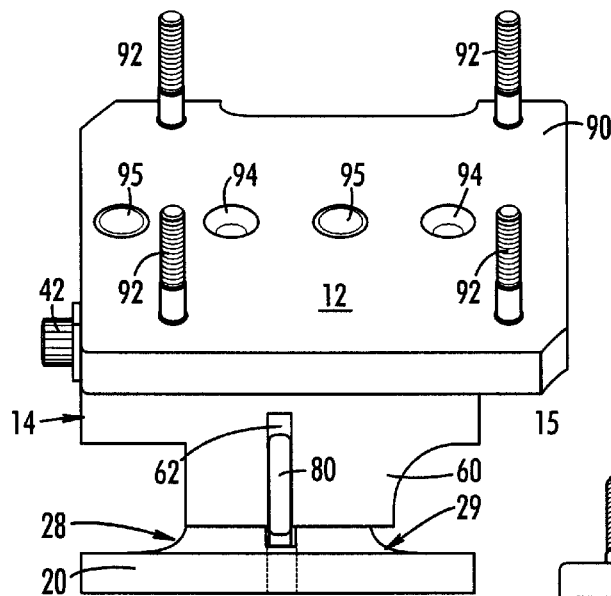
FIG. 5 is a front view of the motor mount of FIG. 2B.
Figure 6:
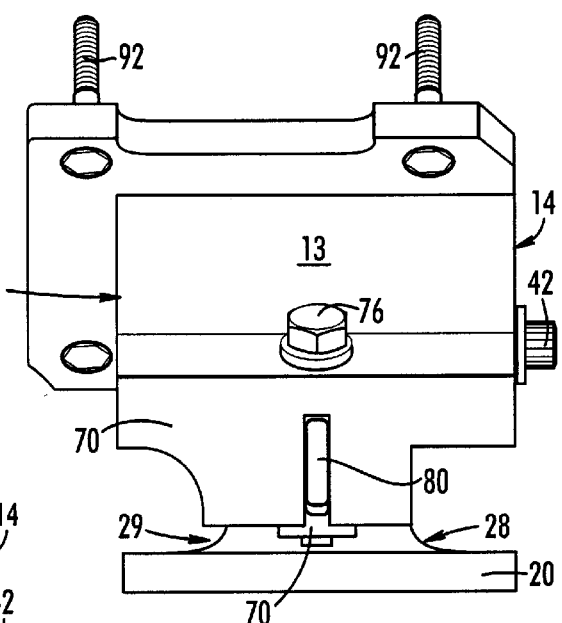
FIG. 6 is a rear view of the motor mount of FIG. 2B.

Referring to FIGS. 4A and 4B, body 30 has a front leg 60 having a front slot 62 and a back leg 70 having a back slot 72, wherein the front slot 62 is aligned with back slot 72. A rail 80 is received within both front slot 62 and back slot 72. Front leg 60 is pivotally attached to rail 80. As best seen in FIGS. 3 and 4B, a pivot pin 64 passes through aligned hinge slot 83 in rail 80 and front leg hole 66. Hinge slot 83 is formed as a slot rather than as a hole to allow some play in the movement of body 30 with respect to base 20 when installing and uninstalling mount 10.

Figure 7:
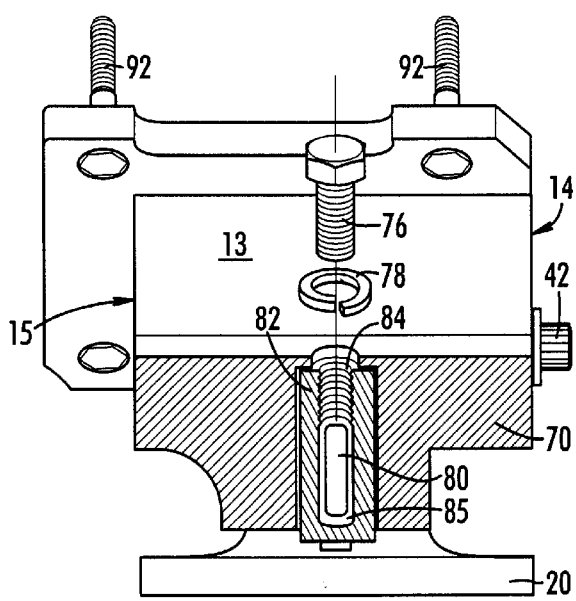
FIG. 7 is a rear, partial cross-sectional view of the motor mount of FIG. 6.

In order to secure rail 80 to back leg 70 of body 30, a bore 74 is formed in body 30. Bore 74 is dimensioned to receive a sleeve 82. Sleeve 82 is internally threaded and has a slot 85 therethrough of sufficient dimension so that sleeve 82 can slidably accommodate rail 80 as best illustrated in FIGS. 2A and 7. A clamp bolt 76 having threads that can matingly engage internal threads of sleeve 82 is used in conjunction with a lock washer 78 to secure back leg 70 to rail 80.

As best seen in FIG. 4A, base 20 is secured to rail 80 using a pin 22 that passes through aligned throughholes 24 and 81 in rail and base. Base 20 has first and second concave walls 28 and 29, respectively, that are preferably dimensioned to receive frame 4 of go-cart 2. Base 20 is pivotally attached to rail 80 to allow a little play between the two which facilitates use of mount 10 in securing it to frame 4.

In use, clamp bolt 76 is removed and body 30 and back leg 70 are pivoted upwards so that railing 4 of go-cart 2 can be received by first and second concave walls 28 and 29 of body 30 Next, body 30 is lowered onto sleeve 82 as sleeve 82 is received within bore 74 in back leg 70. Then clamp bolt 76 is threaded to sleeve 82. A motor plate (not shown) which has previously been secured to mounting bolts 92 on plate 90 can then be attached to body 30. In order to interchange a motor, the user simply rotates lock 42 to a position that allows lateral movement of plate 90 and receiver 96 within track 40 to cutout portions 97 so that plate 90 with motor attached thereto can be lifted clear of body 30. A different motor, attached to a new plate 90, can then be secured to motor mount 10.

A second preferred embodiment is illustrated on FIGS. 8–13 and would preferably be used for securing a modified and super stock type motor. FIGS. 8A and 8B show back perspective views of a motor mount 110 both exploded and assembled, respectively. Motor mount 110 comprises a plate 190 provided with a plurality of mounting bolts 192 that engage the motor plate (not shown), a body 130 having a track 140 that slidably receives plate 190 and allows motors to be interchanged without removing the entire motor mount, and a base 120 that is hingedly attached to body 130.

Plate 190 is dimensioned to secure a motor plate (not shown) and has a plurality of mounting bolts 192 thereon. The number and arrangement of the mounting bolts 192 on the face of plate 190 are to correspond to the number and arrangement of holes in the motor plate.

A receiver 196 is preferably secured to the underside of plate 190 and can be secured in at least two positions to provide the user with flexibility as to where the motor will be once it is mounted. If lateral adjustment is not needed, receiver 196 could be formed integrally or fastened permanently to plate 190, as state above. Receiver 196 has a pair of holes formed therein that are capable of receiving a pair of adjustment bolts 195. A plurality of adjustment holes 194 on the face of receiver 190 allows adjustment bolts 195 to pass therethrough and be received by holes in receiver 196. Receiver 196 is dimensioned and shaped to be received within track 140 on body 130. Although receiver 196 could be formed to have other cross-sectional shapes, preferably receiver 196 is formed to have a trapezoidal cross-section. In order to reduce the clearance area required for removing receiver 196 from track 140, plate 190 has a pair of cutout portions 197 that allow plate 190 and receiver 196 to be pulled clear of body 130 when one end of receiver 196 is moved laterally into alignment with cutout portions 197.

Figure 8A:
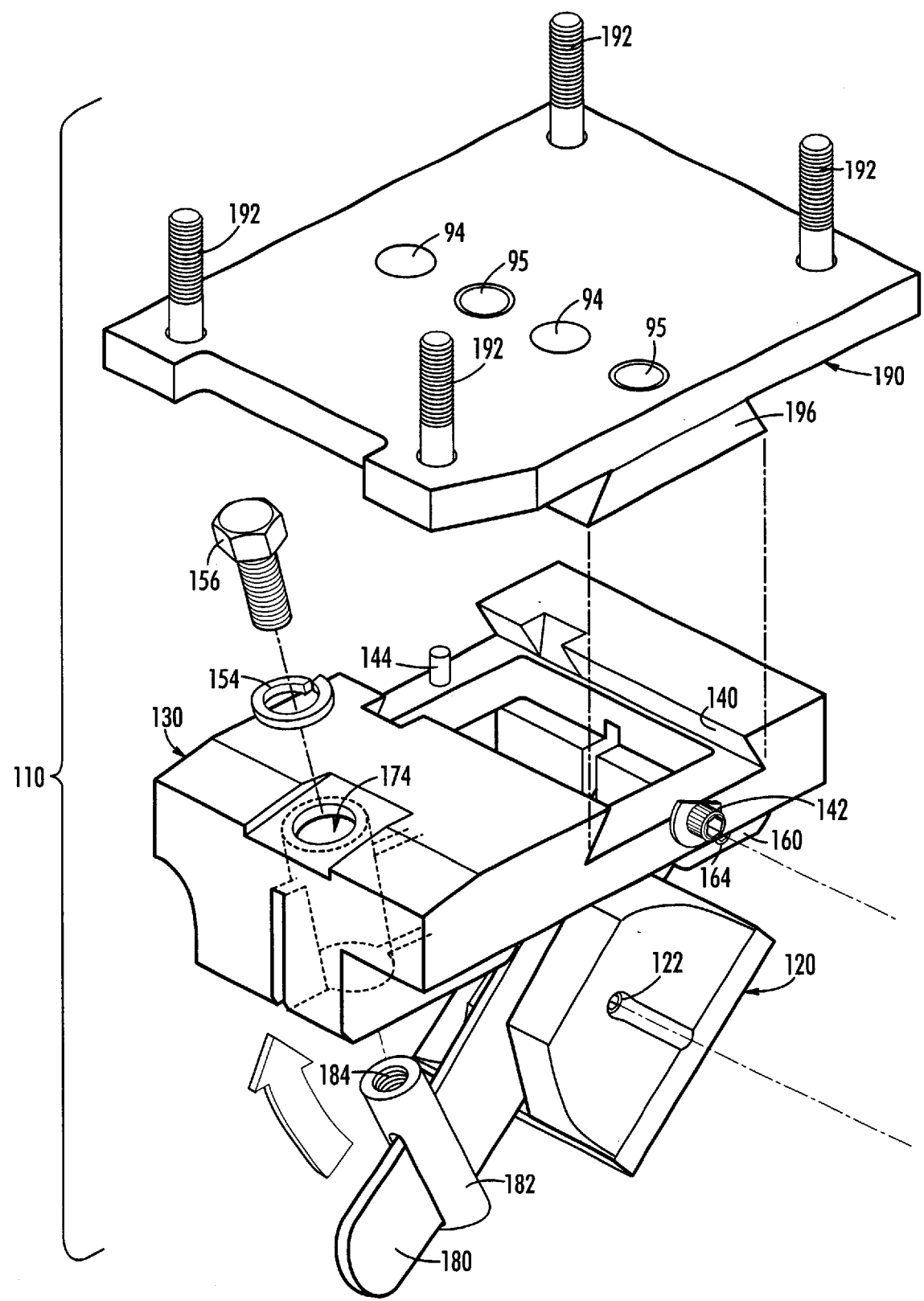
FIG. 8A is a rear, exploded, perspective view of a motor mount according to an alternative embodiment of the present invention.
Figure 8B:
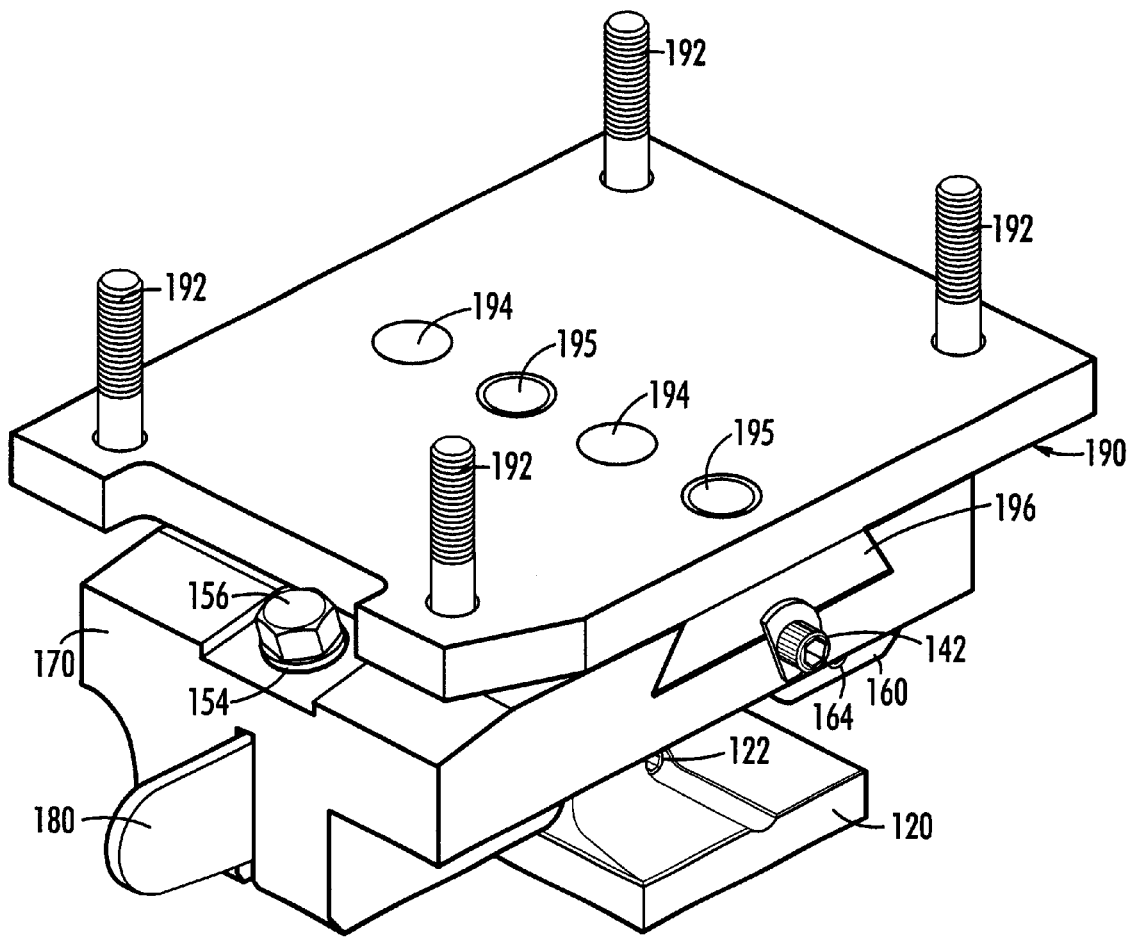
FIG. 8B is a rear, perspective view of the assembled motor mount of FIG. 8A.
Figure 9:
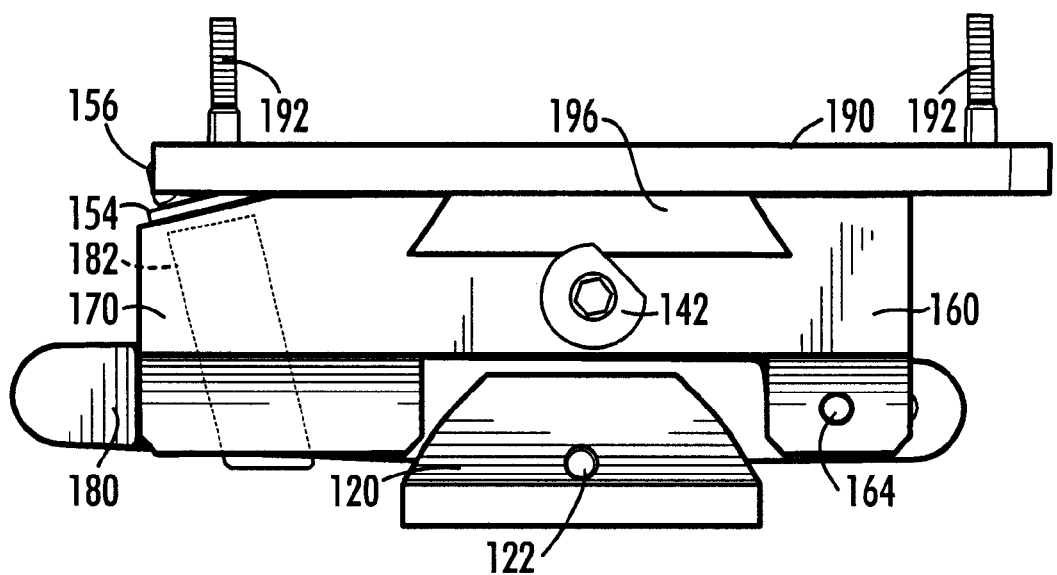
FIG. 9 is a left side view of the alternative motor mount of FIG. 8B.
Figure 10B:
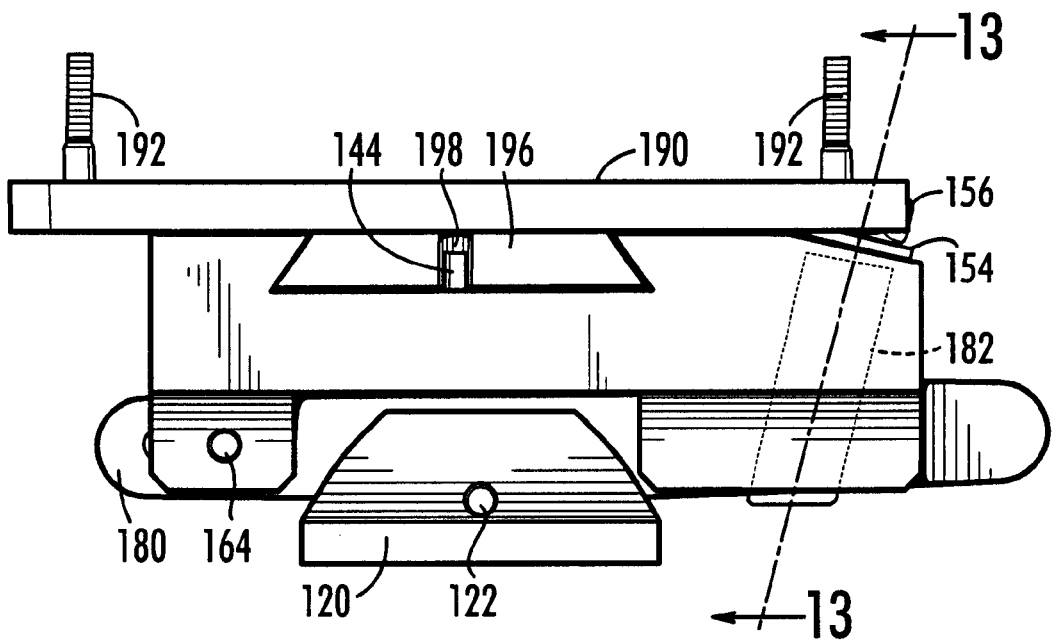
FIG. 10B is a left side view of the assembled alternative motor mount of FIG. 8B.
Figure 10A:
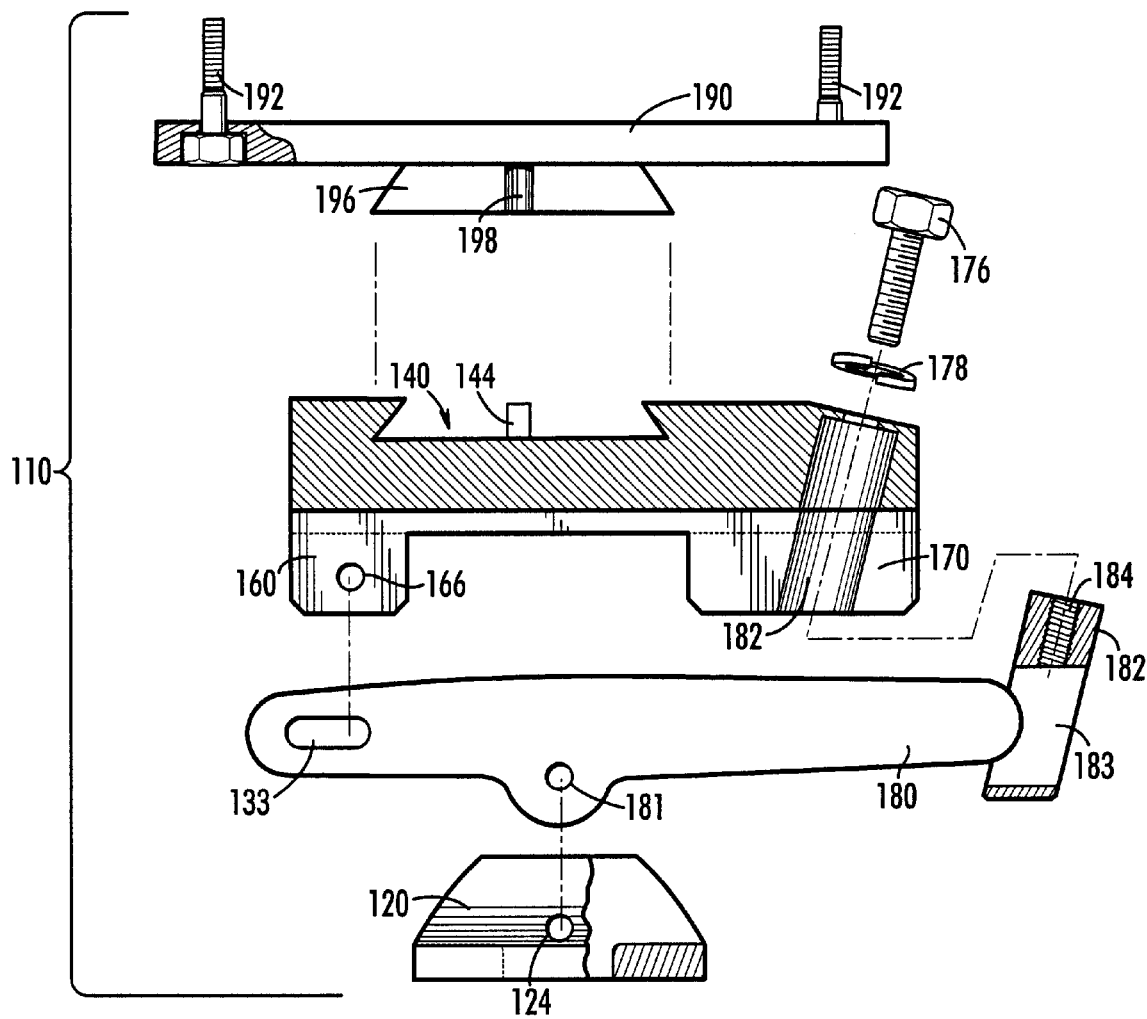
FIG. 10A is a right side, exploded, partial cross sectional view of the alternative motor mount of FIG. 8B.
Figure 11:
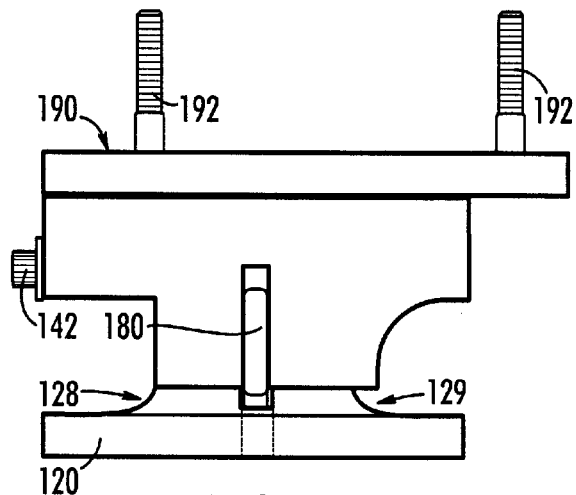
FIG. 11 is an front side view of the alternative motor mount of FIG. 8B.
Figure 12:
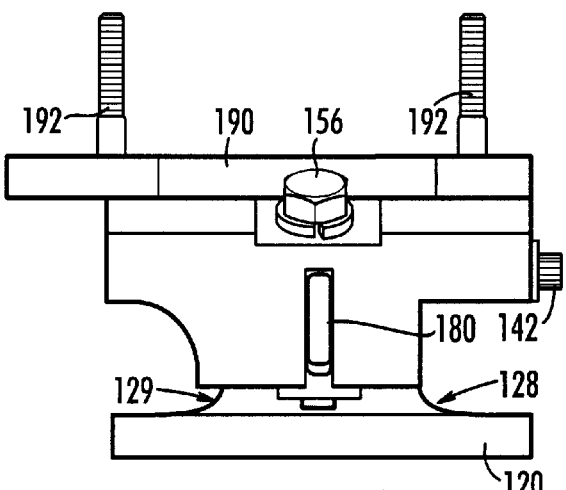
FIG. 12 is a rear view of the alternative motor mount of FIG. 8B.
Figure 13:
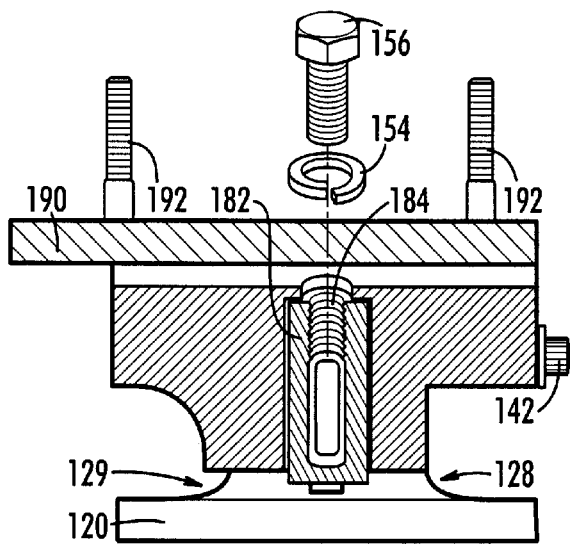
FIG. 13 is a rear, partial cross sectional view of the alternative motor mount of FIG. 12.

Body 130 comprises a surface 132 that is capable of carrying plate 190. Surface 132 is preferably horizontal when mount 110 is fastened to a level frame 4 in order to easily accommodate a go-cart motor. On the left end of track 140 is a lock 142, as best seen in FIG. 9, while the right end of track 140 has a stop 144 as shown in FIGS. 10A and 10B. Stop 144 limits lateral movement of receiver 196 and is received within stop slot 198 of receiver 196 when receiver 196 is in position. Lock 142 may then be rotated to a position that prevents movement of receiver 196 as illustrated in FIG. 8B or left in a position that allows movement of receiver 196 as illustrated in FIG. 8A.

Referring to FIGS. 10A and 10B, body 130 has a front leg 160 having a front slot 162 and a back leg 170 having a back slot 172, wherein the front slot 162 is aligned with the back slot 172. A rail 180 is received by both front slot 162 and back slot 172 so that front leg 160 is pivotally attached to rail 180. As best seen in FIG. 10B, a hinge pin 164 passes through aligned hinge slot 181 in rail and front leg hole 166. In order to secure rail 180 to back leg 170 of body 130, a bore 174 transversely passes through body 130, which is capable of accommodating sleeve 182. Sleeve 182 is internally threaded and has a slot 183 therethrough of sufficient dimension so that sleeve 182 can be slidably accommodated by rail 180 as best illustrated in FIG. 8A. A clamp bolt 156 having threads that can matingly engage internal threads of sleeve 182 is used in conjunction with a lock washer 154 to secure back leg 170 to rail 180.

As best seen in FIG. 10A, base 120 is secured to rail 180 using a pin 122 that passes through aligned throughholes 124 and 181 in rail and base 120. Base 120 has first and second concave walls 128 and 129 that are preferably dimensioned to receive frame 4 of go-cart 2.

In use, clamp bolt 156 is removed and front leg 160 and body 130 are lifted so that frame 4 of go-cart 2 can be received by first and second concave walls 128, 129, and between body 130 and base 120. Next, the body 130 is lowered to base 120 so that sleeve 182 is received within bore 174 in back leg 170 and clamp bolt 156 is threadedly secured to sleeve 182. A motor plate (not shown) is then secured to mounting bolts 192 on plate 190. In order to interchange a motor, the user simply rotates lock 142 to a position that allows lateral movement of plate 190. Plate 190 is moved slightly so that receiver 196 is aligned with cutout portions 197, and then the motor can be removed. A different motor already attached to another plate 190, can then be secured on the track 140.

It will be apparent to those skilled in the art that many changes and substitutions can be made to the preferred embodiments herein described without departing from the spirit and scope of the present invention.

What is claimed is:

1. A mount for securing a motor to a go-cart frame, said mount comprising:
   a clamp having a closed position and an open position, said clamp formed to grip a frame of a go-cart when in said closed position; and
   an adaptor releasibly securable to said clamp, said adaptor capable of being attached to a motor for a go-cart so that said adaptor can be released from said clamp when said motor is to be removed from said go-cart while said clamp remains in said closed position and gripping said frame, wherein said clamp further comprises:
   a base having a front and an opposing back; and
   a body having a front and an opposing back;
   said front of said base being pivotally attached to said front of said body and said back of said base being releasibly securable to said back of said body so that said clamp can be moved between said open and said closed positions by pivoting said base with respect to said body; and
   wherein said base further comprises a rail, and wherein said body has a slot formed therein dimensioned for receiving said rail.

2. The mount as recited in claim 1, wherein said body further comprises a single bolt for releasibly securing said back end of said body to said back end of said base.

3. The mount as recited in claim 1, wherein said rail has a front and an opposing back, and said back carries a threaded sleeve, and wherein said body has a bore formed therein and dimensioned to receive said threaded sleeve, and wherein said body is releasibly secured to said base by a bolt threadedly received within said threaded sleeve.

4. A mount for securing a motor to a frame of a go-cart, said mount comprising:
   a base having a front and an opposing back;
   a body having a front and an opposing back, said front of said body being pivotally attached to said front of said base;
   means for releasibly securing said back of said base to said back of said body;
   a plate adapted for attaching a motor thereto; and
   means for releasibly locking said plate to said body, wherein said body has a track formed therein and said plate includes a receiver attached thereto, said receiver dimensioned to be slidably receivable within said track.

5. The mount as recited in claim 4, wherein said securing means includes means carried by said body for preventing lateral movement of said receiver when said receiver is received within said track.

6. The mount as recited in claim 4, wherein said track has at least one cutout portion formed therein for permitting said receiver to be lifted clear of said track.

7. The mount as recited in claim 4, wherein said securing means includes a single bolt, and wherein, when said mount is attached to a frame of a go-cart and said single bolt is removed from said body, said mount can be removed from said frame.

8. The mount as recited in claim 4, wherein said base includes a rail having a front (end) and an opposing back (end), said front (end) of said body being pivotally attached to said front (end) of said rail so that said body can be pivoted with respect to said rail between an open and a closed position.

9. The mount as recited in claim 8, further comprising a threaded sleeve carried by said rail, and said body has a bore formed therein for receiving said sleeve, and wherein said securing means includes a threaded bolt that threads to said sleeve to prevent said back of said body from being moved with respect to said back of said rail.

10. The mount as recited in claim 4, wherein the ends of said receiver have a trapezoidal cross-section.

11. A mount for securing a motor to a go-cart, said mount comprising:
    a base;
    a rail attached to said base, said rail having a front end and an opposing back end;
    a body having a front end and an opposing back end, said front end of said body being pivotally secured to said front end of said rail so that said body can pivot with respect to said rail between an open and a closed position;
    means for locking said back end of said body to said rail, said locking means being carried by body; and
    a plate carried by said body and having means for securing a motor to said plate.

12. The mount as recited in claim 11, wherein said body had a bore formed therein, and wherein said locking means comprises:
  an internally threaded cylindrical sleeve having a transverse slot therethrough, said rail received within said slot of said sleeve, said sleeve dimensioned to be receivable within said bore of said body; and
  a bolt receivable by said threaded sleeve in said body.

13. The mount as recited in claim 11, wherein said body has a track formed therein and said plate further comprises a receiver capable of being slidably received by said track.

14. The mount as recited in claim 13, further comprising means for locking said receiver within said track.

15. The mount as recited in claim 13, wherein said track has at least one cutout portion and said receiver is dimensioned to be held within said track except at said cutout portion so that said receiver can be removed from said track at said cutout portion.

16. The mount as recited in claim 13, wherein the ends of said receiver have trapezoidal cross-sections.

* * * * *